(12) United States Patent
Byun

(10) Patent No.: US 10,860,231 B2
(45) Date of Patent: Dec. 8, 2020

(54) MEMORY SYSTEM FOR ADJUSTING MAP SEGMENT BASED ON PATTERN AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 28 days.

(21) Appl. No.: 16/408,221

(22) Filed: May 9, 2019

(65) Prior Publication Data
US 2020/0125261 A1   Apr. 23, 2020

(30) Foreign Application Priority Data

Oct. 18, 2018   (KR) ......................... 10-2018-0124324

(51) Int. Cl.
*G06F 3/06* (2006.01)
*G06F 12/02* (2006.01)
*G06F 12/0815* (2016.01)

(52) U.S. Cl.
CPC ............ *G06F 3/064* (2013.01); *G06F 3/0604* (2013.01); *G06F 3/0659* (2013.01); *G06F 3/0679* (2013.01); *G06F 12/0246* (2013.01); *G06F 12/0815* (2013.01); *G06F 2212/7201* (2013.01)

(58) Field of Classification Search
CPC ...... G06F 3/064; G06F 3/0604; G06F 3/0659; G06F 3/0679; G06F 12/0246; G06F 12/0815
See application file for complete search history.

(56) References Cited

U.S. PATENT DOCUMENTS

| 8,516,221 B2 * | 8/2013 | Thelen ................ G06F 12/1027 711/207 |
| 8,601,223 B1 * | 12/2013 | Yuan .................... G06F 12/1009 711/154 |
| 2008/0120488 A1 * | 5/2008 | Woo ..................... G06F 12/0246 711/209 |
| 2014/0244901 A1 * | 8/2014 | Panda ................. G06F 12/0246 711/103 |
| 2016/0062885 A1 * | 3/2016 | Ryu ..................... G06F 12/0246 711/103 |

(Continued)

FOREIGN PATENT DOCUMENTS

KR   10-1662827   10/2016

*Primary Examiner* — Ryan Bertram
(74) *Attorney, Agent, or Firm* — IP & T Group LLP

(57) ABSTRACT

An operating method of a memory system which includes a controller including one or more processors and a memory device including a plurality of memory blocks, the operating method comprises receiving a first write command; checking whether there is available storage space in a zeroth map segment, using a location of first logical block address (LBA) information written to the zeroth map segment; determining a pattern of the first LBA information and second LBA information corresponding to a first write command when there is no storage space in the zeroth map segment; increasing a sequential count for the second LBA information when the pattern of the first and second LBA information is determined to be a sequential pattern; and performing a map updating operation on a memory block of the memory device by variably adjusting a size of the zeroth map segment based on one or more pieces of LBA information.

19 Claims, 8 Drawing Sheets

(56) References Cited

U.S. PATENT DOCUMENTS

| | | |
|---|---|---|
| 2017/0371548 A1 | 12/2017 | Um |
| 2018/0275873 A1* | 9/2018 | Frid .................... G06F 12/0246 |
| 2018/0314644 A1* | 11/2018 | Hwang ............... G06F 12/1009 |
| 2019/0278526 A1* | 9/2019 | Choi ..................... G06F 3/0688 |
| 2020/0042242 A1* | 2/2020 | Byun .................... G06F 3/0673 |

* cited by examiner

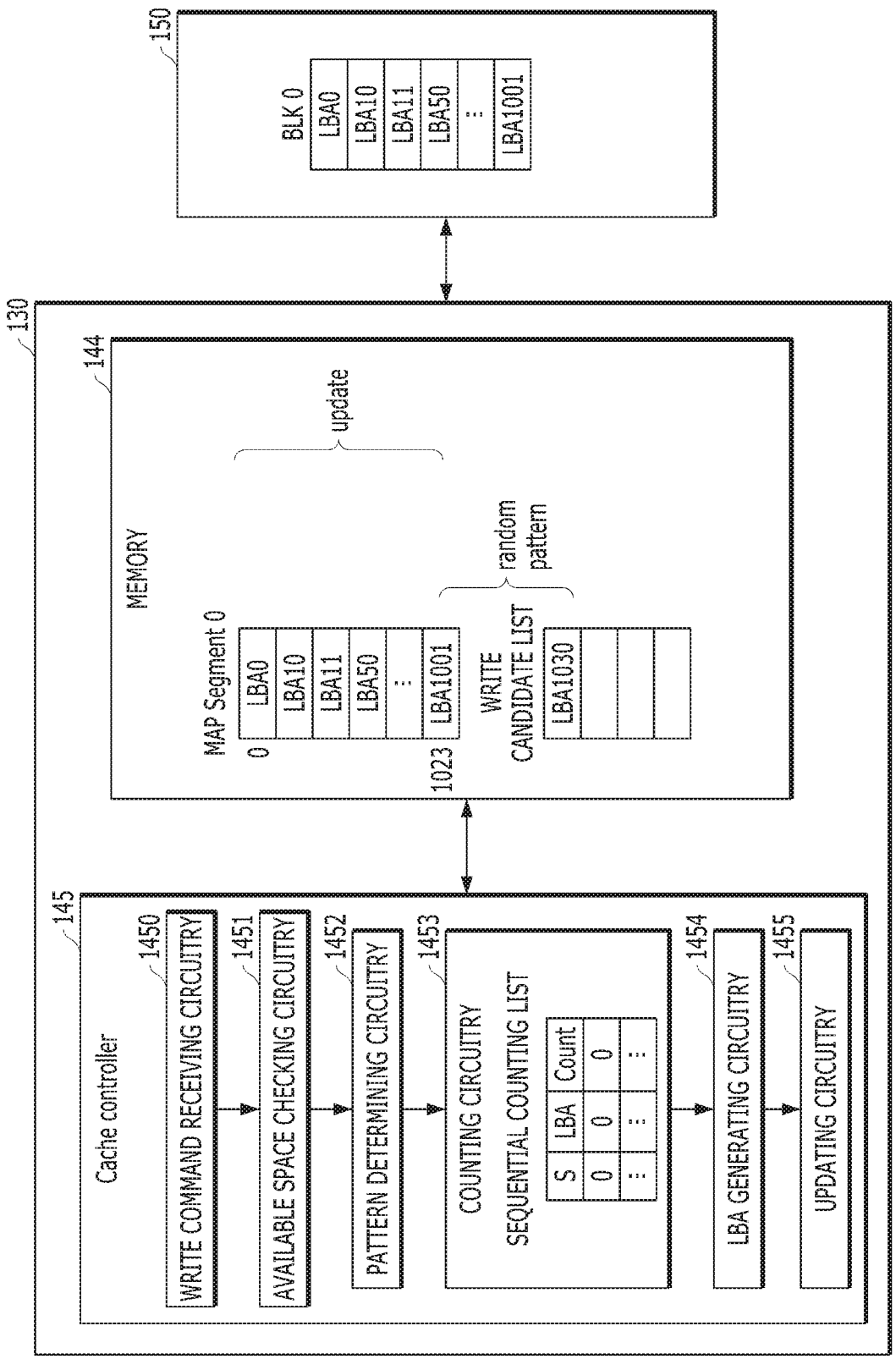

MEMORY SYSTEM FOR ADJUSTING MAP SEGMENT BASED ON PATTERN AND OPERATING METHOD THEREOF

CROSS-REFERENCE TO RELATED APPLICATION

The present application claims priority under 35 U.S.C. § 119(a) to Korean Patent Application No. 10-2018-0124324, filed on Oct. 18, 2018, the disclosure of which is incorporated herein by reference in its entirety.

BACKGROUND

1. Field

Various embodiments of the present invention generally relate to a memory device. More particularly, the embodiments relate to a memory system, and an operating method thereof.

2. Description of the Related Art

Recently, the paradigm for the computer environment has shifted to ubiquitous computing, which allows computer systems to be used anytime and anywhere. Due to this fact, the use of portable electronic devices such as mobile phones, digital cameras, and notebook computers has rapidly increased. In general, such portable electronic devices use a memory system which uses a memory device, that is, a data storage device. The data storage device is used as a main memory device or an auxiliary memory device of the portable electronic devices.

SUMMARY

Embodiments of the present invention are directed to a memory system for reducing the number of map updates by variably adjusting the size of a map segment and performing an update, and an operating method of the memory system.

In accordance with an embodiment, a memory system may include: a controller including one or more processors; and a memory device including a plurality of memory blocks, wherein the controller comprises: a command receiving circuitry suitable for receiving a first write command from a command queue; a storage space checking circuitry suitable for checking whether there is available storage space in a zeroth map segment area, using a location of first logical block address (LBA) information written to the zeroth map segment area; a pattern determining circuitry suitable for determining a pattern of the first LBA information and second LBA information corresponding to the first write command when there is no storage space in the zeroth map segment area; a counting circuitry suitable for increasing a sequential count when the determination result of the pattern determining circuitry indicates that the pattern of the first and second LBA information is a sequential pattern; an LBA generating circuitry suitable for generating one or more pieces of LBA information based on the sequential count; and an updating circuitry suitable for performing a map updating operation on a memory block of the memory device by variably adjusting a size of the zeroth map segment area based on the one or more pieces of LBA information.

In accordance with an embodiment, an operating method of a memory system which includes a controller including one or more processors and a memory device including a plurality of memory blocks, the operating method may include: receiving a first write command; checking whether there is available storage space in a zeroth map segment area, using a location of first logical block address (LBA) information written to the zeroth map segment area; determining a pattern of the first LBA information and second LBA information corresponding to a first write command when there is no storage space in the zeroth map segment area; increasing a sequential count for the second LBA information when the pattern of the first and second LBA information is determined to be a sequential pattern; and performing a map updating operation on a memory block of the memory device by variably adjusting a size of the zeroth map segment area based on one or more pieces of LBA information.

In accordance with an embodiment, an operating method of a memory system which includes a controller including one or more processors and a memory device including a plurality of memory blocks, the operating method may include: checking whether there is available storage space in a zeroth map segment area, using a location of first logical block address (LBA) information written to the zeroth map segment area; determining a pattern of the first LBA information written to the zeroth map segment area and second LBA information corresponding to the first write command when there is no available storage space in the zeroth map segment area; increasing a sequential count for the second LBA information until the pattern of the first and second LBA information is a random pattern; updating the zeroth map segment area to a memory block when the pattern of the first and second LBA information is a random pattern; and changing the zeroth map segment area to a first map segment area, generating one or more pieces of LBA information based on the sequential count, and writing the generated one or more pieces of LBA information to the second map segment area.

In accordance with an embodiment, a memory system may include: a memory device including a plurality of memory blocks; and a controller including a memory and a cache controller suitable for storing logical block address (LBA) information in the memory and update the LBA information to the memory device, wherein the cache controller comprises: receiving and storing a plurality of pieces of LBA information in the memory; generating a map segment that includes multiple pieces of LBA information among the plurality of pieces of LBA information; determining whether a last piece of LBA information in the map segment and another piece of LBA information in a list that is received after the last piece of LBA information form a pattern; and updating the map segment or both the map segment and the list to a select block among the plurality of memory blocks based on the determined pattern.

BRIEF DESCRIPTION OF THE DRAWINGS

FIGS. 4A and 4B are diagrams schematically illustrating a memory system in accordance with a first embodiment.

DETAILED DESCRIPTION

Various embodiments of the invention are described below in more detail with reference to the accompanying drawings. It is noted, however, that the invention may be embodied in different forms. Moreover, aspects and features of the present invention may be configured or arranged differently than shown in the illustrated embodiments. Thus, the present invention is not to be construed as being limited to the embodiments set forth herein. Rather, the described embodiments are provided so that this disclosure is thorough and complete and fully conveys the present invention to those skilled in the art to which this invention pertains. Also, throughout the specification, reference to "an embodiment," "another embodiment" or the like is not necessarily to only one embodiment, and different references to any such phrase are not necessarily to the same embodiment(s).

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Various embodiments of the present invention are described in detail below with reference to the attached drawings.

Figure 1:
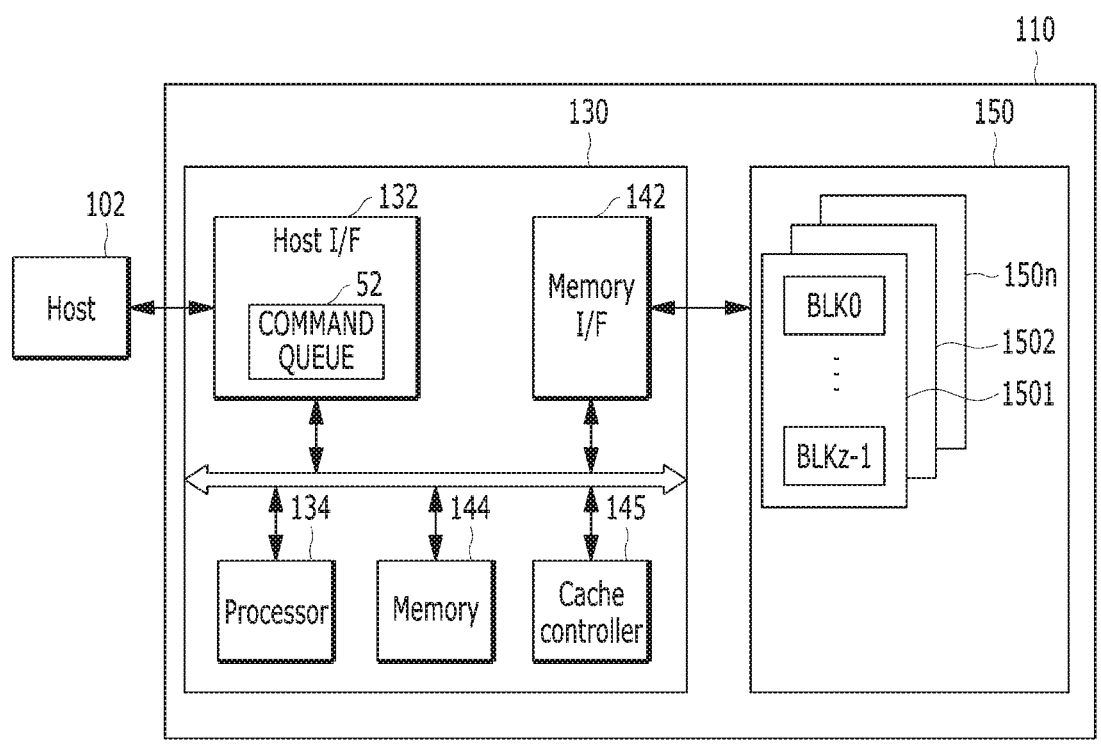
FIG. 1 is a block diagram schematically illustrating a data processing system including a memory system in accordance with an embodiment.

FIG. 1 is a block diagram illustrating a data processing system 100 including a memory system in accordance with an embodiment.

Referring to FIG. 1, the data processing system 100 may include a host 102 and a memory system 110.

The host 102 may be embodied by any of various electronic devices, for example, portable electronic devices such as a mobile phone, an MP3 player and a laptop computer or electronic devices such as a desktop computer, a game machine, a television (TV) and a projector, that is, wired and wireless electronic devices.

Also, the host 102 includes at least one operating system (OS). The operating system generally manages and controls the functions and operations of the host 102, and provides interoperability between the host 102 and a user using the data processing system 100 or the memory system 110. The operating system supports functions and operations corresponding to the user's purpose of use and the use of the operating system. For example, the operating system may be a general operating system or a mobile operating system depending on the mobility of the host 102. The general operating system may be a personal operating system or an enterprise operating system depending on the user's usage environment. For example, the personal operating system configured to support a service providing function for a general user may include Windows and Chrome, and the enterprise operating system configured to secure and support high performance may include Windows server, Linux and Unix. The mobile operating system configured to support a mobility service providing function and a system power saving function to users may include Android, iOS, Windows mobile, etc. The host 102 may include a plurality of operating systems, and executes the operating systems to perform operations with the memory system 110 in correspondence to a user request. The host 102 transmits a plurality of commands corresponding to a user request to the memory system 110, and accordingly, the memory system 110 performs operations corresponding to the commands, that is, operations corresponding to the user request.

The memory system 110 operates in response to a request of the host 102, and, in particular, stores data to be accessed by the host 102. In other words, the memory system 110 may be used as a main memory device or an auxiliary memory device of the host 102. The memory system 110 may be implemented as any one of various kinds of storage devices, depending on a host interface protocol which is coupled with the host 102. For example, the memory system 110 may be implemented as any one of a solid state driver (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

Any of the storage devices which implement the memory system 110 may be a volatile memory device such as a dynamic random access memory (DRAM) and/or a static random access memory (SRAM), or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM) and/or a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). In the case where the memory system 110 is used as an SSD, the operating speed of the host 102 which is coupled to the memory system 110 may be improved. The controller 130 and the memory device 150 may be integrated into one semiconductor device to form a memory card such as a personal computer memory card international association (PCMCIA) card, a compact flash (CF) card, a smart media card (e.g., an SM and an SMC), a memory stick, a multimedia card (e.g., an MMC, an RS-MMC and a micro- MMC), a secure digital card (e.g., an SD, a mini-SD, a micro-SD and an SDHC), and/or a universal flash storage (UFS) device.

In another embodiment, the memory system 110 may be disposed in a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may retain stored data even though power is not supplied. In particular, the memory device 150 stores the data provided from the host 102 through a write operation, and provides stored data to the host 102 through a read operation. The memory device 150 includes a plurality of memory dies 1501 to 150n.

Each of the plurality of memory dies 1501 to 150n includes a plurality of memory blocks BLK0 to BLKz–1, each of which includes a plurality of pages. Each of the pages includes a plurality of memory cells to which a plurality of word lines (WL) are coupled. Also, the memory device 150 includes a plurality of planes, each of which includes a plurality of memory blocks, e.g., blocks BLK0 to BLKz–1. In particular, the memory device 150 may include a plurality of memory dies 1501 to 150n, each of which includes a plurality of planes. The memory device 150 may be a nonvolatile memory device, for example, a flash memory. The flash memory may have a three-dimensional (3D) stack structure.

The controller 130 controls the memory device 150 in response to a request from the host 102. For example, the controller 130 provides the data read from the memory device 150, to the host 102, and stores the data provided from the host 102, in the memory device 150. To this end, the controller 130 controls the operations of the memory device 150, such as read, write, program and erase operations.

The controller 130 includes a host interface (I/F) 132, a processor 134, a memory interface (I/F) 142, a memory 144 and a cache controller 145.

The host interface unit 132 is for handling commands, data, and the like transmitted from the host 102. By way of example but not limitation, the host interface unit 132 can include a command queue 52. The command queue 52 can sequentially store at least some of commands, data, or the like transmitted from the host 102 and output them to a cache controller 145 in their stored order.

The host interface 132 processes the commands and data of the host 102, and may be configured to communicate with the host 102 through at least one of various interface protocols such as universal serial bus (USB), multimedia card (MMC), peripheral component interconnect express (PCI-e or PCIe), serial attached SCSI (SAS), serial advanced technology attachment (SATA), parallel advanced technology attachment (PATA), small computer system interface (SCSI), enhanced small disk interface (ESDI), integrated drive electronics (IDE) and mobile industry processor interface (MIPI). The host interface 32 may be driven through firmware referred to as a host interface layer (HIL), which is a region which exchanges data with the host 102.

The memory interface 142 serves as a memory interface and/or storage interface which performs interfacing between the controller 130 and the memory device 150 to allow the controller 130 to control the memory device 150 in response to a request from the host 102. The memory interface 142 generates control signals for the memory device 150 and processes data according to the control of the processor 134, as a NAND flash controller (NFC) in the case where the memory device 150 is a flash memory, in particular, in the case where the memory device 150 is a NAND flash memory. The memory interface 142 may support the operation of an interface which processes a command and data between the controller 130 and the memory device 150, for example, a NAND flash interface, in particular, data input/output between the controller 130 and the memory device 150. The memory interface 142 may be driven through firmware, referred to as a flash interface layer (FIL), which is a region which exchanges data with the memory device 150.

The memory 144, as the working memory of the memory system 110 and the controller 130, stores data for driving of the memory system 110 and the controller 130. For example, when the controller 130 controls the memory device 150 in response to a request from the host 102, the controller 130 may provide data read from the memory device 150 to the host 102, and/or store data provided from the host 102 in the memory device 150. To this end, when the controller 130 controls the operations of the memory device 150, such as read, write, program and erase operations, the memory 144 stores data needed to allow such operations to be performed by the memory system 110, that is, between the controller 130 and the memory device 150.

The memory 144 may be realized by a volatile memory. For example, the memory 144 may be realized by a static random access memory (SRAM) or a dynamic random access memory (DRAM). Furthermore, the memory 144 may be disposed within the controller 130 as shown in FIG. 1. Alternatively, the memory 144 may be external to the controller 130, and in this regard, may be realized as a separate external volatile memory in communication with the controller 130 through a memory interface.

As described above, the memory 144 stores data to perform data read and write operations between the host 102 and the memory device 150 and data when performing the data read and write operations. For such data storage, the memory 144 includes a program memory, a data memory, a write buffer/cache, a read buffer/cache, a data buffer/cache, a map buffer/cache, and the like.

The processor 134 controls all operations of the memory system 110. In particular, the processor 134 controls a program operation or a read operation for the memory device 150, in response to a write request or a read request from the host 102. The processor 134 drives firmware, referred to as a flash translation layer (FTL), to control the general operations of the memory system 110. The processor 134 may be more than one processor, each of which may be realized by a microprocessor or a central processing unit (CPU).

For instance, the controller 130 performs an operation requested from the host 102, in the memory device 150, that is, performs a command operation corresponding to a command received from the host 102, with the memory device 150, through the processor 134 embodied by a microprocessor or a central processing unit (CPU). The controller 130 may perform a foreground operation as a command operation corresponding to a command received from the host 102. For example, the foreground operation includes a program operation corresponding to a write command, a read operation corresponding to a read command, an erase operation corresponding to an erase command or a parameter set operation corresponding to a set parameter command or a set feature command as a set command.

The controller 130 may also perform a background operation for the memory device 150, through the processor 134. The background operation includes an operation of copying the data stored in one memory block, among the memory blocks BLK1 to BLKz of the memory device 150, to another memory block. Such a background operation may be a garbage collection (GC) operation, an operation of swapping select memory blocks BLK1 to BLKz or data stored therein, e.g., a wear leveling (WL) operation, an operation of storing map data stored in the controller 130 in the memory blocks BLK1 to BLKz, e.g., a map flush operation, or an operation of performing bad block management for the memory device 150, for example, an operation of identifying and processing a bad block among the memory blocks BLK1 to BLKz in the memory device 150.

Generally, the controller 130 writes information of a logical block address LBA (i.e., LBA information) included in a command transferred from a command queue 52, for example, a write command, to an area corresponding to a certain (e.g., zeroth) map segment (or a zeroth map segment area). When LBA information is written by a size allocated to the zeroth map segment, for example, 18 KB, the controller 130 has to update the zeroth map segment to the memory device 150. To improve this process, the cache controller 145 does not update the zeroth map segment. Instead, the cache controller 145 determines a pattern of first LBA information written to an area corresponding to the maximum index Max_Index of the zeroth map segment and second LBA information to be written, when plural pieces of LBA information are written by the size allocated to the zeroth map segment. The first LBA information includes the previous LBA information, and the second LBA information includes current LBA information which is transferred from the current command queue so as to be written. When the determination result indicates that the pattern of the first and second LBA information is a sequential pattern, the cache controller 145 counts the sequential LBA information until the pattern of the first and second LA information is determined to a random pattern. In other words, whenever the pattern of the first and second LA information is determined as a sequential pattern, the cache controller 145 may increase a sequential count. The cache controller 145 may generate one or more pieces of LBA information by the sequential count and additionally merge the generated LBA information into the zeroth map segment, thereby updating the memory device 150. In other words, the cache controller 145 may update the memory device 150 by variably adjusting the size of the zeroth map segment. In this regard, the cache controller 145 in accordance with a first embodiment will be described in detail with reference to FIGS. 4A and 4B.

In another embodiment, when plural pieces of LBA information are written by the size allocated to the zeroth map segment, the cache controller 145 determines a pattern of first LAB information written to Max_Index of the zeroth map segment area and second LBA information to be written, without updating the zeroth map segment. The first LBA information includes the previous LBA information, and the second LBA information includes current LBA information which is transferred from the current command queue so as to be written. When the determination result indicates that the pattern of the first and second LBA information is a sequential pattern, the cache controller 145 counts the sequential LBA information until the pattern of the first and second LBA information is determined as a random pattern. In other words, whenever the pattern of the first and second LA information are determined as a sequential pattern, the cache controller 145 may increase a sequential count. When the determination result indicates that the pattern of the first and second LBA information is a random pattern, the cache controller 145 updates the plural pieces of LBA information written to the zeroth map segment area by the size allocated to the zeroth map segment into the memory device 150. Sequentially, after deleting the plural pieces of LBA information written to the zeroth map segment area, the cache controller 145 changes the zeroth map segment to a first map segment, and generates one or more pieces of LBA information by the sequential count. The cache controller 145 writes the generated LBA information to an area corresponding to the first map segment. In this regard, the cache controller 145 in accordance with a second embodiment will be described in detail with reference to FIG. 5.

In some embodiments, a memory system that includes one or more storage devices operatively associated with a host and including one or more processors and program commands is provided. For example, one or more storage devices including one or more processors and program commands may be implemented with the memory 144 and the processor 134 which are included in the controller 130.

Figure 2:
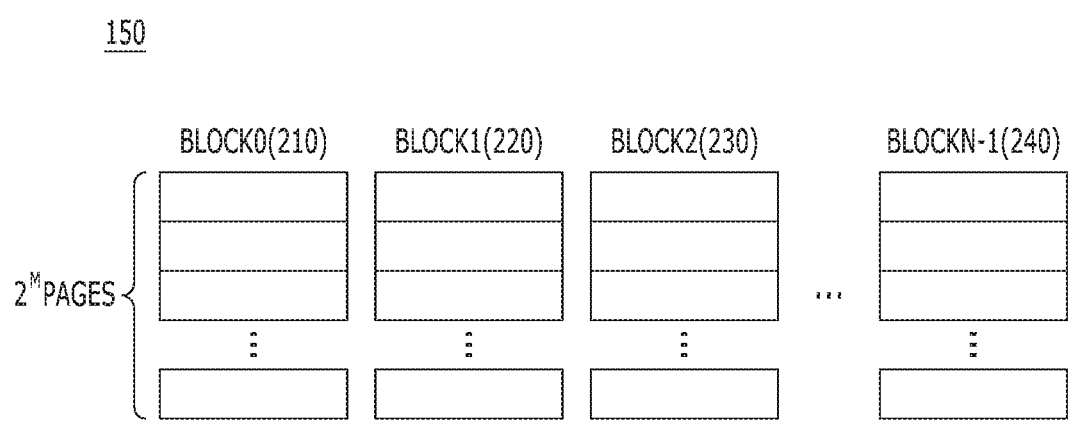
FIG. 2 is a schematic diagram illustrating an exemplary configuration of a memory device employed in the memory system shown in FIG. 1.

FIG. 2 is a diagram illustrating a memory device in a memory system.

Referring to FIG. 2, the memory device 150 includes a plurality of memory blocks, for example, a zeroth block BLK0, a first block BLK1, a second block BLK2 and an (z−1)th block BLKz−1. Each of the blocks BLK0, BLK1, BLK2 and BLKz−1 includes a plurality of pages, for example, $2^M$ or M pages. Each of the pages includes a plurality of memory cells to which a plurality of word lines (WL) are coupled.

The memory device 150 may include single level cell (SLC) memory blocks and/or multi-level cell (MLC) memory blocks, depending on the number of bits to be stored in or expressed by one memory cell. An SLC memory block includes a plurality of pages which are realized by memory cells each storing 1 bit, and has high data calculation performance and high durability. An MLC memory block includes a plurality of pages which are realized by memory cells each storing multi-bit data (for example, 2 or more bits), and has a larger data storage space than the SLC memory block, that is, is capable of being highly integrated. In particular, the memory device 150 may include, as MLC memory blocks, an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data, or a multiple level cell memory block including pages which are realized by memory cells each capable of storing 5 or more-bit data.

While it is described as an example that the memory device 150 is realized by a nonvolatile memory such as a flash memory, for example, a NAND flash memory, it is noted that the memory device 150 may be implemented as any of multiple types of memories such as a phase change memory (i.e., phase change random access memory (PCRAM)), a resistive memory (i.e., resistive random access memory (RRAM or ReRAM)), a ferroelectric memory (i.e., ferroelectric random access memory (FRAM)) and a spin transfer torque magnetic memory (i.e., spin transfer torque magnetic random access memory (STT-RAM or STT-MRAM)).

Each of the memory blocks BLK0, BLK1, BLK2 and BLKz-1 stores the data provided from the host 102 of FIG. 1, through a write operation, and provides stored data to the host 102, through a read operation.

Figure 3:
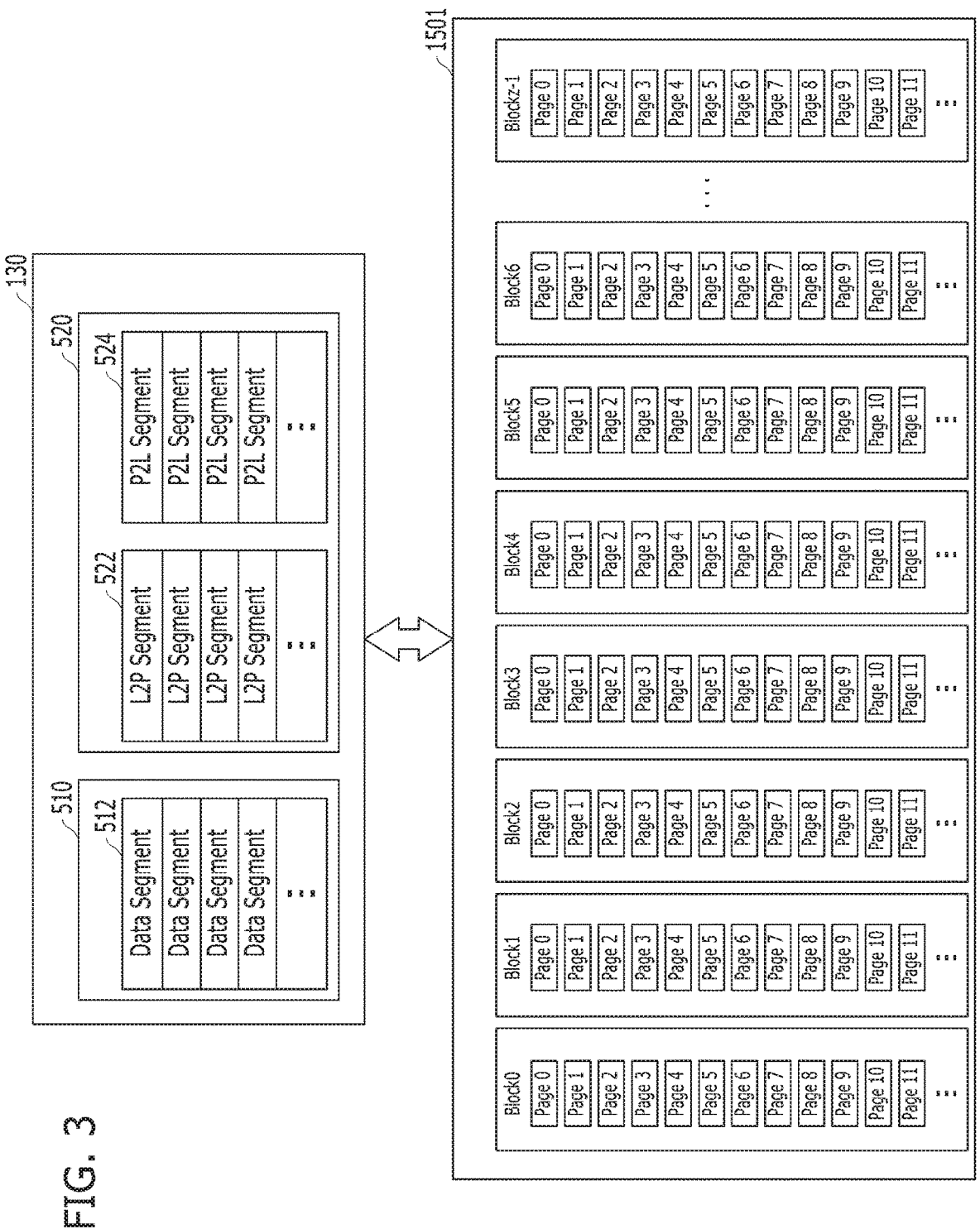
FIG. 3 is a diagram illustrating a data processing operation with respect to a memory device in a memory system in accordance with an embodiment.

FIG. 3 is a diagram illustrating a data processing operation with respect to a memory device in a memory system in accordance with an embodiment.

Referring to FIG. 3, the controller 130 performs a command operation corresponding to a command received from the host 102, for example, a program operation corresponding to a program command. The controller 130 programs and stores user data corresponding to the program command in the plurality of pages in memory blocks BLK0 to BLKz-1 of the memory device 150.

The controller 130 generates and updates metadata for the user data, and programs and stores the metadata in the memory blocks BLK0 to BLKz-1 of the memory device 150. The metadata include logical to physical (logical/physical or L2P) information and physical to logical (physical/logical or P2L) information for the user data stored in the memory blocks BLK0 to BLKz-1. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all information and data, excluding user data, corresponding to a command received from the host 102.

For example, the controller 130 caches and buffers user data corresponding to a program command received from the host 102, in a first buffer 510 of the controller 130. That is, the controller 130 stores data segments 512 of the user data in the first buffer 510 as a data buffer/cache. The first buffer 510 may be included in the memory 144 of the controller 130. Thereafter, the controller 130 programs and stores the data segments 512 stored in the first buffer 510, in the pages included in the memory blocks BLK0 to BLKz-1 of the memory device 150.

As the data segments 512 of the user data are programmed and stored in the pages in the memory blocks BLK0 to BLKz-1, the controller 130 generates L2P segments 522 and P2L segments 524 as metadata. Then, the controller 130 stores the L2P segments 522 and the P2L segments 524 in a second buffer 520 of the controller 130. The second buffer 520 may be included in the memory 144 of the controller 130. In the second buffer 520, the L2P segments 522 and the P2L segments 524 may be stored in the form of a list. Then, the controller 130 programs and stores the L2P segments 522 and the P2L segments 524 in the pages in the memory blocks BLK0 to BLKz-1 through a map flush operation.

The controller 130 performs a command operation corresponding to a command received from the host 102. For example, the controller 130 performs a read operation corresponding to a read command. The controller 130 checks L2P segments 522 and P2L segments 524 of user data corresponding to the read command by loading them in the second buffer 520. Then, the controller 130 reads data segments 512 of the user data from a storage position known through the checking. That is, the controller 130 reads the data segments 512 from a specific page of a specific memory block among the memory blocks BLK0 to BLKz-1. Then, the controller 130 stores the data segments 512 in the first buffer 510, and provides the data segments 512 to the host 102.

Figure 4A:
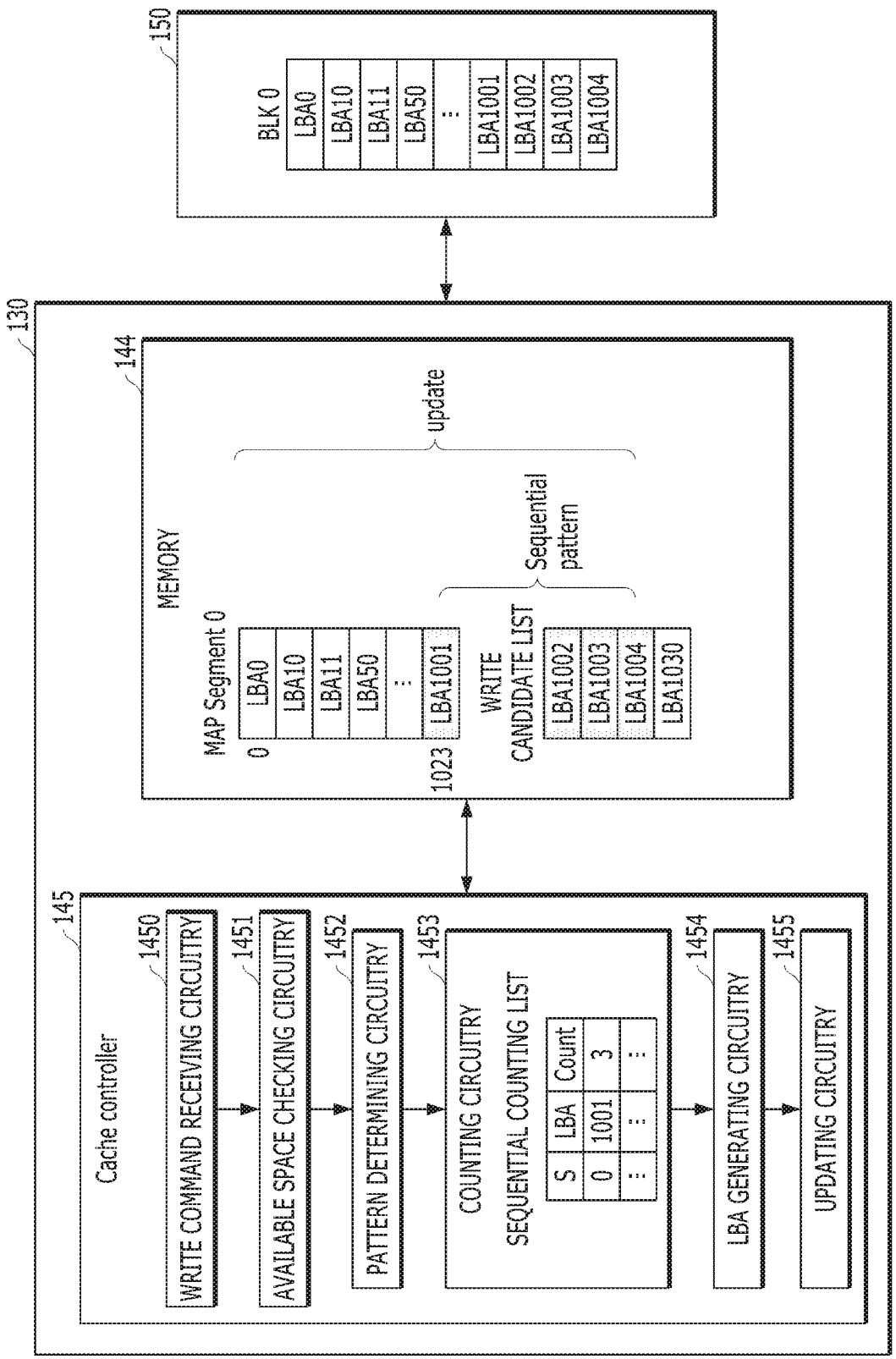

FIGS. 4A and 4B are diagrams schematically illustrating a memory system in accordance with a first embodiment. FIG. 4A illustrates a case where first logical block address (LBA) information and second LBA information are a sequential pattern. FIG. 4B illustrates a case where the first LBA information and the second LBA information are a random pattern.

Referring to FIGS. 4A and 4B, the memory system 110 may include a controller 130 and a memory device 150.

The controller 130 may include a memory 144 and a cache controller 145. As described above with reference to FIG. 1, the controller 130 may include the host interface 132, the processor 134 and the memory interface 142. However, these components are omitted in FIGS. 4A and 4B for clarity. The cache controller 145 may be driven by the processor 134. The cache controller 145 may include a write command receiving circuitry 1450, an available space checking circuitry 1451, a pattern determining circuitry 1452, a counting circuitry 1453, an LBA generating circuitry 1454 and an updating circuitry 1455.

As used in the disclosure, the term 'circuitry' can refer to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to a particular claim element, an integrated circuit for a storage device.

Referring to FIG. 4A, the write command receiving circuitry 1450 may request, from the command queue 52, command information including plural pieces of command information, and receive, from the command queue, the requested piece(s) of command information. For example, the plural pieces of command information may include a write command or a read command. Furthermore, the plural pieces of command information may include a write command. And again, the plural pieces of command information may include first to fourth write commands. The write command receiving circuitry 1450 may request a first write command from the command queue, and receive the first write command.

In order to write LBA information included in the first write command received through the write command receiving circuitry 1450 to an area corresponding to a zeroth map segment S0 (or a map segment area), the available space checking circuitry 1451 may check an available space of the map segment area corresponding to the zeroth map segment S0. The available space checking circuitry 1451 may check the available space of the map segment area corresponding to the zeroth map segment S0 by checking whether the LBA Information is written in the map segment area corresponding to the zeroth map segment S0 by the size of the zeroth map segment S0. In other words, the available space checking circuitry 1451 may check the available space of the map segment area corresponding to the zeroth map segment S0 by checking whether a location of first LBA information written prior to second LBA information indicates Max_INDEX (e.g., 1023) allocated to the map segment area corresponding to the zeroth map segment S0. When the check result shows that the location where the first LBA information is written does not indicate the Max_INDEX of the map segment area corresponding to the zeroth map segment S0, the second LBA information corresponding to the first write command may be stored in the map segment area corresponding to the zeroth map segment S0 by the updating circuitry 1455, which is to be described below. On the other hand, when the check result shows that the location where the first LBA information is written indicates the Max_INDEX of the map segment area corresponding to the zeroth map segment S0, the available space checking circuitry 1451 may determine that the map segment area corresponding to the zeroth map segment S0 has no available space to which the second LBA information is to be written. Herein, in order to reduce the number of operations of updating the memory device 150 through the updating circuitry 1455, the pattern determining circuitry 1452 determines patterns of the first and second LBA information without updating the zeroth map segment S0 to the memory device 150.

The pattern determining circuitry 1452 may determine the pattern of the first LBA information, which is written to the Max_INDEX of the map segment area corresponding to the zeroth map segment S0 and the second LBA information to be written currently, corresponding to the first write command.

Since the determination result of the pattern determining circuitry 1452 indicates that the first and second LBA information are sequential, the counting circuitry 1453 increases sequential counting information, and stores the increased sequential counting information in a sequential counting list. The sequential counting list may include map segment information 'S', LBA information 'LBA' stored in the index Max_INDEX of the map segment area corresponding to the map segment and a sequential LBA count 'COUNT'. For example, as shown in FIG. 4A, the sequential counting list shows that the map segment information 'S' may include the zeroth map segment (0), the LBA information 'LBA' may include LBA1001, and the sequential LBA count 'COUNT' may be 3.

More specifically, when the first LBA information written to the Max_INDEX of the map segment area corresponding to the zeroth map segment S0 is LBA1001, and the second LBA information corresponding to the first write command is LBA1002, the pattern determining circuitry 1452 determines that the patterns of the first and second LBA information are sequential patterns. And, the sequential LBA count 'COUNT' may be 1 by the counting circuitry 1453.

Because the patterns of the LBA1001 and LBA1002 are sequential patterns, the pattern determining circuitry 1452 determines patterns of LBA information included in the second, third and fourth write commands received from the command queue through the write command receiving circuitry 1450. For example, when the patterns of the first LBA information included in the first write command and the second LBA information included in the second write command are determined as a sequential pattern since the first LBA information is LBA1002 and the second LBA information is LBA1003, the sequential LBA count 'COUNT' may be increased from 1 to 2 by the counting circuitry 1453. Subsequently, when the pattern of the first LBA information included in the second write command and the second LBA information included in the third write command are determined as a sequential pattern since the first LBA information is LBA1003 and the second LBA information is LBA1004, the sequential LBA count 'COUNT' may be increased from 2 to 3 by the counting circuitry 1453.

Subsequently, when the pattern of the first LBA information included in the third write command and the second LBA information included in the fourth write command are determined as a random pattern since the first LBA information is LBA1004 and the second LBA information is LBA1030, a counting operation is not performed by the counting circuitry 1453, but the LBA generating circuitry 1454 and the updating circuitry 1455 operate.

The LBA generating circuitry 1454 generates one or more pieces of LBA information based on the sequential counting list. For example, it may be seen that the sequential LBA count 'COUNT' after LBA1001 written to the Max_INDEX of the map segment area corresponding to the zeroth map segment S0 is 3. In other words, when the size capable of storing one LBA information is 4 KB, the LBA generating circuitry 1454 may calculate the size of LBA information to be generated additionally as COUNT*4 KB. That is, since the sequential LBA count 'COUNT' is 3, 12 KB may be calculated.

The updating circuitry 1455 variably adjusts the size of the zeroth map segment S0 by adding the LBA information generated by the LBA generating circuitry 1454 to the zeroth map segment S0, and updates the zeroth map segment S0 to the memory device 150. In other words, the updating circuitry 1455 may merge the size 12 KB of the zeroth map segment S0 with the size 12 KB of the additionally generated LBA information to update the memory device 150, thereby reducing the number of updates.

In various embodiments, the cache controller 145 does not update the zeroth map segment S0, but determines the patterns of the first LBA information written to the Max_Index of the map segment area corresponding to the zeroth map segment S0 and the second LBA information to be written, when plural pieces of LBA information are written by the size allocated to the zeroth map segment S0 or the map segment area corresponding to the zeroth map segment S0. The first LBA information includes the previous LBA information, and the second LBA information includes LBA information which is transferred from the current command queue so as to be written. When the determination result indicates that such first and second LBA information is a sequential pattern, the cache controller 145 counts the sequential LBA information until the patterns of the first and second LBA information is determined as a random pattern. In other words, whenever the pattern of the first and second LA information is determined as a sequential pattern, the cache controller 145 may increase a sequential count. The cache controller 145 may generate one or more pieces of LBA information by the sequential count, and additionally merge the generated LBA information into the zeroth map segment, thereby updating the memory device 150. In other words, the cache controller 145 may update the memory device 150 by variably adjusting the size of the zeroth map segment S0.

Referring to FIG. 4B, the write command receiving circuitry 1450 may request, from a command queue, command information including plural pieces of command information, and receive, from the command queue, the requested piece(s) of command information. For example, the plural pieces of command information may include a write command or a read command. Furthermore, the plural pieces of command information may include a write command. And again, the plural pieces of command information may include first to fourth write commands. The write command receiving circuitry 1450 may request a first write command to the command queue, and receive the first write command from the command queue.

In order to write LBA information included in the first write command received through the write command receiving circuitry 1450 to a map segment area of the memory 144 corresponding to the zeroth map segment S0, the available space checking circuitry 1451 may check an available space of the map segment area corresponding to the zeroth map segment S0. The available space checking circuitry 1451 may check the available space of the map segment area corresponding to the zeroth map segment S0 by checking whether the LBA Information is written in the map segment area corresponding to the zeroth map segment S0 by the size of the zeroth map segment S0. In other words, the available space checking circuitry 1451 may check the available space of the zeroth map segment S0 by checking whether a location of first LBA information written prior to second LBA information indicates Max_INDEX (e.g., 1023) allocated to the map segment area corresponding to the zeroth map segment S0. When the check result shows that the location where the first LBA information does not indicate the Max_INDEX of the map segment area corresponding to the zeroth map segment S0, the second LBA information corresponding to the first write command may be stored in the map segment area corresponding to the zeroth map segment S0 by the updating circuitry 1455, which is to be described below. On the other hand, when the check result shows that the location where the first LBA information is written indicates the Max_INDEX of the zeroth map segment S0, the available space checking circuitry 1451 may determine that the map segment area corresponding to the zeroth map segment S0 has no available space to which the second LBA information can be written. Herein, in order to reduce the number of operations of updating the memory device 150 through the updating circuitry 1455, the pattern determining circuitry 1452 determines patterns of the first and second LBA information without updating the zeroth map segment S0 to the memory device 150.

The pattern determining circuitry 1452 may determine the pattern of the first LBA information, which is written to the Max_INDEX of the map segment area corresponding to the zeroth map segment S0 and the second LBA information to be written currently, corresponding to the first write command. For example, when the first LBA information written to Max_INDEX of the map segment area corresponding to the zeroth map segment S0 is LBA1001, and the second LBA information corresponding to the first write command is LBA1030, the pattern determining circuitry 1452 determines that the pattern of the first and second LBA information is a random pattern.

The updating circuitry 1455 may update the plural pieces of LBA information included in the zeroth map segment S0 to the memory device 150, and LBA1030 corresponding to the first write command may be written to a first map segment.

Figure 5:
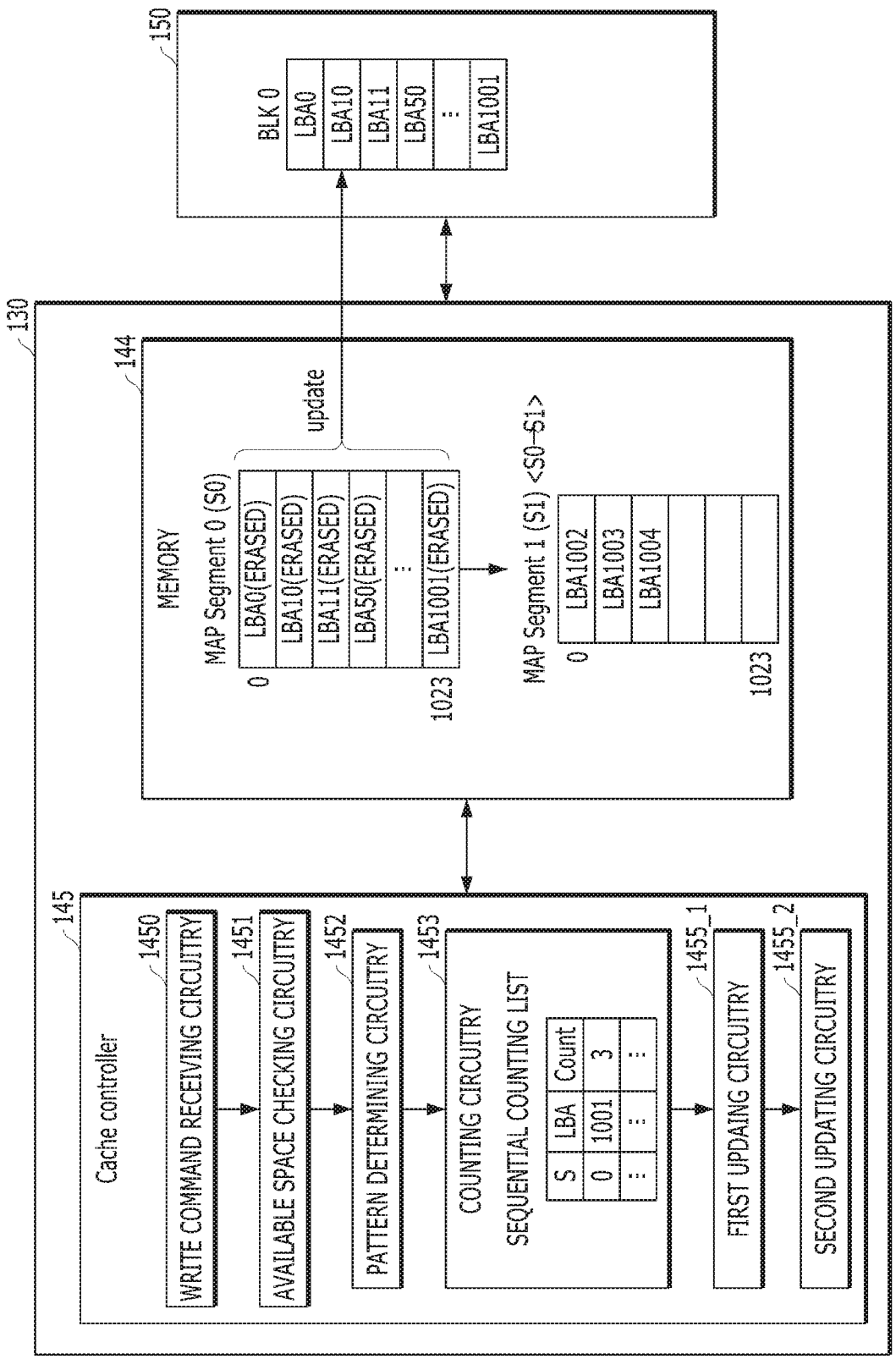
FIG. 5 is a diagram schematically illustrating a memory system in accordance with a second embodiment.

FIG. 5 is a diagram schematically illustrating a memory system in accordance with a second embodiment.

Referring to FIG. 5, the memory system 110 may include a controller 130 and a memory device 150.

The controller 130 may include a memory 144 and a cache controller 145. As described above with reference to FIG. 1, the controller 130 may include the host interface 132, the processor 134 and the memory interface 142. However, these components are omitted in FIG. 5 for clarity. The cache controller 145 may be driven by the processor 134. The cache controller 145 may include a write command receiving circuitry 1450, an available space checking circuitry 1451, a pattern determining circuitry 1452, a counting circuitry 1453, and first and second updating circuitries 1455_1 and 1455_2.

Referring to FIG. 5, since the write command receiving circuitry 1450, the available space checking circuitry 1451, the pattern determining circuitry 1452 and the counting circuitry 1453 are the same as those described above in accordance with the first embodiment, descriptions thereof are omitted. The first and second updating circuitries 1455_1 and 1455_2 are described below.

After the first and second LBA information are determined as a sequential pattern by the pattern determining circuitry 1452, the first updating circuitry 1455_1 updates only plural pieces of LBA information included in the zeroth map segment S0 to the memory device 150, when the LBA information received from the command queue through the write command receiving circuitry 1450 is random LBA information. In other words, the first updating circuitry 1455_1 updates only the LBA information which is the size (e.g., 18 KB) of the zeroth map segment S0 to the memory device 150. Subsequently, the first updating circuitry 1455_1 changes the zeroth map segment S0 to a first map segment S1 by deleting the information of the zeroth map segment S0. In other words, the zeroth map segment S0 and the first map segment S1 are the same region.

The second updating circuitry 1455_2 may perform an update by generating LBA information by the LBA count based on a sequential counting list stored in the counting circuitry 1453 and writing the generated LBA information to the map segment area corresponding to the first map segment S1.

Figure 6:
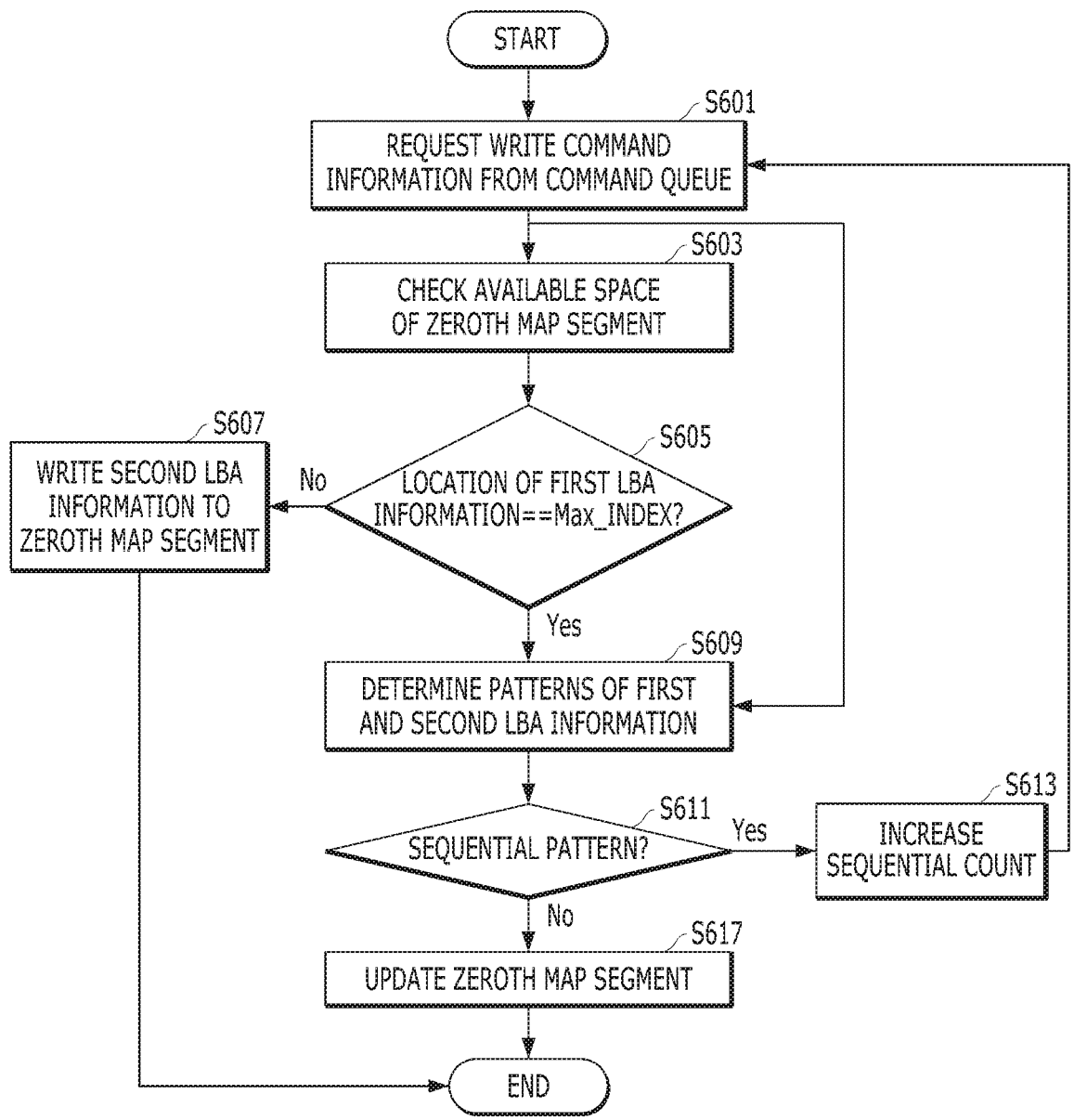
FIG. 6 is a flowchart illustrating an operating method of a memory system in accordance with the first embodiment.

FIG. 6 is a flowchart for describing an operating method of the memory system 110 in accordance with the first embodiment. The operating method of FIG. 6 may be performed by the memory system 110 including the cache controller 145 of FIGS. 1 to 4A and 4B.

Referring to FIG. 6, at step S601, the cache controller 145 may request, from a command queue, command information including plural pieces of command information and receive, from the command queue, the requested piece(s) of command information. For example, the plural pieces of command information may include a write command or a read command. Furthermore, the plural pieces of command information may include a write command. And again, the plural pieces of command information may include first to fourth write commands. The cache controller 145 may request and sequentially receive the write commands from the command queue.

At steps S603 and S605, the cache controller 145 may check an available space of an area (i.e., a map segment area) corresponding to the zeroth map segment S0 in order to write the LBA information included in the first write command to the map segment area corresponding to the zeroth map segment S0. The cache controller 145 may check the available space of the map segment area corresponding to the zeroth map segment S0 by checking whether the LBA information is written in the map segment area corresponding to the zeroth map segment S0 by the size of the zeroth map segment S0. In other words, the cache controller 145 may check the available space of the map segment area corresponding to the zeroth map segment S0 by checking whether the location of the first LBA information written prior to the second LBA information indicates the Max_INDEX allocated to the map segment area corresponding to the zeroth map segment S0.

When the check result shows that the location where the first LBA information is written does not indicate the Max_INDEX of the map segment area corresponding to the zeroth map segment S0 (that is, "NO" at step S605), at step S607, the cache controller 145 may write the second LBA information corresponding to the first write command to the map segment area corresponding to the zeroth map segment S0. On the other hand, when the check result shows that the location where the first LBA information is written indicates the Max_INDEX of the map segment area corresponding to the zeroth map segment S0 (that is, "YES" at step S605), at step S609 and S611, the cache controller 145 may determine the pattern of the first LBA information written to the Max_INDEX of the map segment area corresponding to the zeroth map segment S0 and the second LBA information to be written currently, corresponding to the first write command.

When the determination result indicates that the pattern of the first and second LBA information is a sequential pattern (that is, "YES" at step S611), the cache controller 145 may increase the sequential count at step S613. For example, as shown in FIG. 4A, when the first LBA information written to the Max_INDEX of the map segment area corresponding to the zeroth map segment S0 is LBA1001, and the second LBA information corresponding to the first write command is LBA1002, the cache controller 145 may determine that the pattern of the first and second LBA information is a sequential pattern, and increase the sequential count. As the steps S601 to S609 are repeatedly performed a set or predetermined number of times until the pattern of the first and second LBA information becomes a random pattern, the sequential count may be increased at each iteration.

On the other hand, as shown in FIG. 4B, when the determination result indicates that the pattern of the first and second LBA information is a random pattern (that is, "NO" at step S611), at step S617, the cache controller 145 may check the sequential counting list, and then update only the plural pieces of LBA information written to the map segment area corresponding to the zeroth map segment into the memory device 150 in the case that the sequential counting list has no count information.

At step S617, when the check result of the sequential counting list shows that the sequential counting list has count information, the cache controller 145 may generate one or more pieces of LBA information sequential to the LBA information written to the Max_INDEX of the map segment area corresponding to the zeroth map segment S0, based on the count information. Sequentially, the cache controller 145 may merge the generated one or more LBA information with the zeroth map segment S0, thereby updating the memory device 150.

Figure 7:
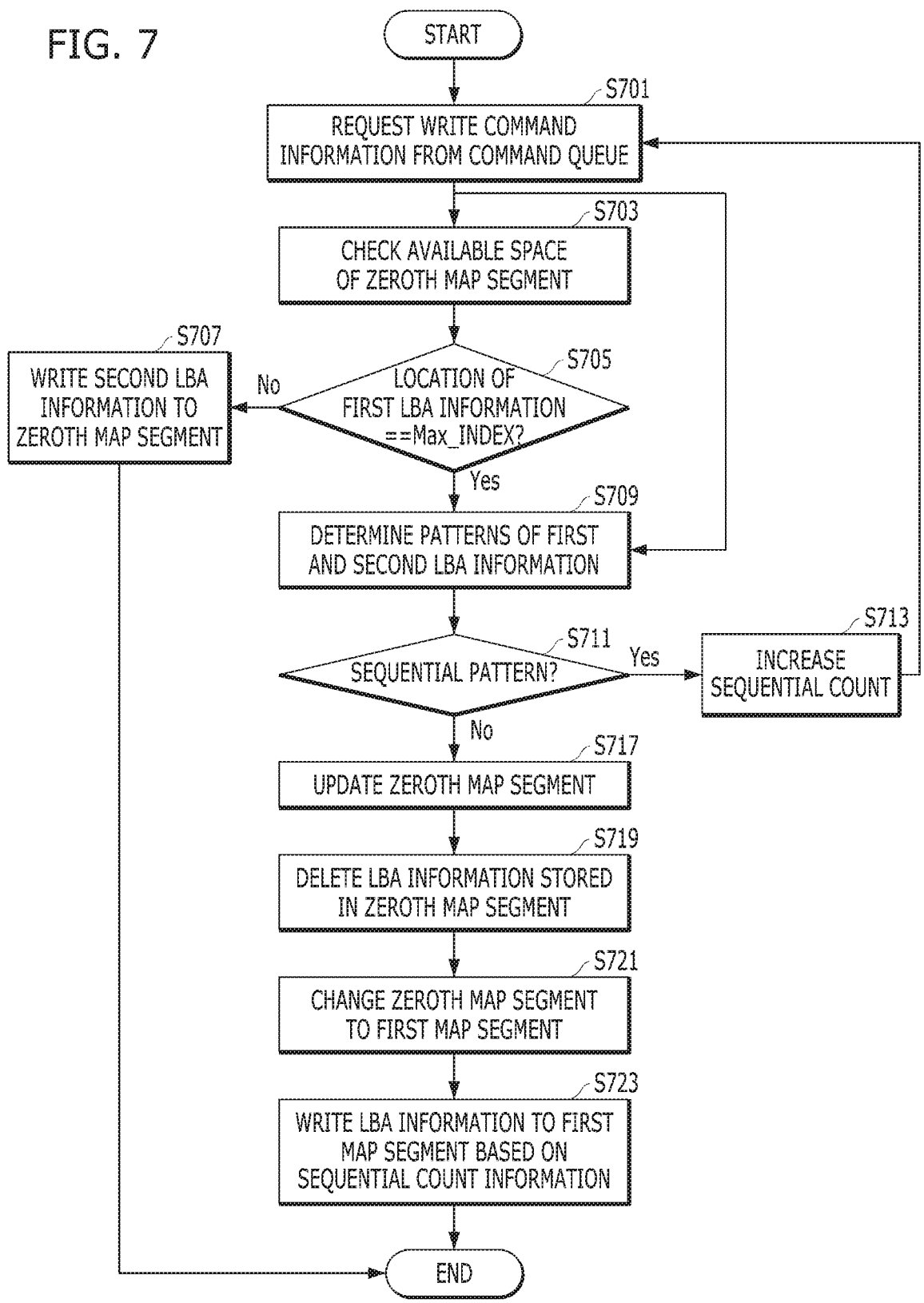
FIG. 7 is a flowchart illustrating an operating method of a memory system in accordance with the second embodiment.

FIG. 7 is a flowchart illustrating an operating method of a memory system in accordance with the second embodiment. The operating method of FIG. 7 may be performed by the memory system 110 including the cache controller 145 of FIGS. 1 to 5.

Referring to FIG. 7, since steps S701 to S713 are the same as steps S601 to S613 described above with reference to FIG. 6, descriptions thereof are omitted.

At step S717, when the determination result of step S711 indicates that that the pattern of the first and second LBA information is a random pattern, the cache controller 145 may check the sequential counting list. When the sequential counting list has no count information, the cache controller 145 may update only the plural pieces of LBA information written to the map segment area corresponding to the zeroth map segment into the memory device 150. On the other hand, when the sequential counting list has count information, at step S719, the cache controller 145 may update only the plural pieces of LBA information written to the map segment area corresponding to the zeroth map segment into the memory device 150, and then delete the LBA information written to the map segment area corresponding to the zeroth map segment. At step S721, the cache controller 145 may change the zeroth map segment to the first map segment. At step S723, the cache controller 145 may generate one or more pieces of LBA information sequential to the LBA information written to the Max_INDEX of the map segment area corresponding to the zeroth map segment based on the count information, and write the generated LBA information to the first map segment.

Figure 8:
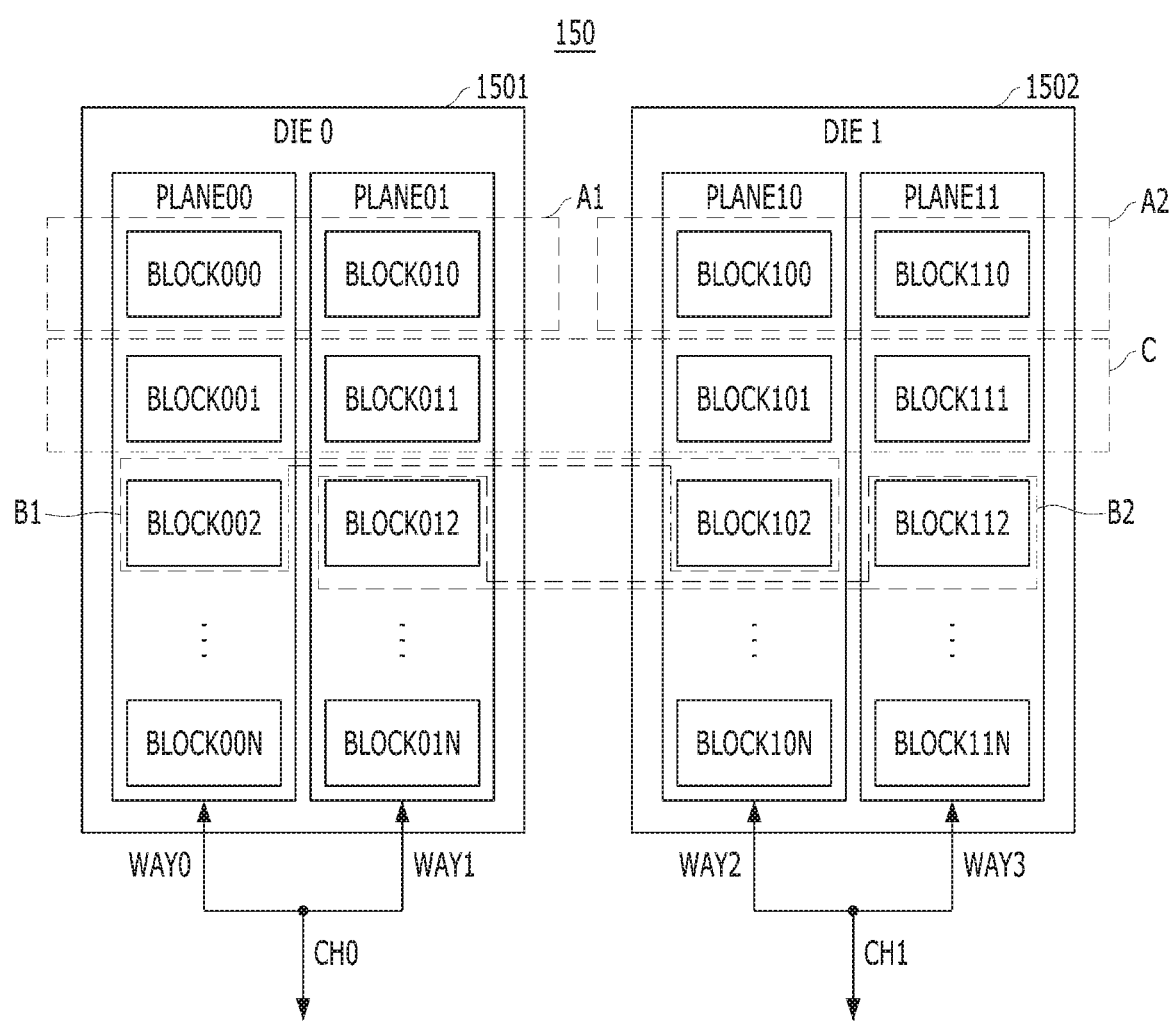
FIG. 8 is a diagram illustrating the concept of a super memory block used in a memory system in accordance with an embodiment.

FIG. 8 is a diagram illustrating the concept of a super memory block used in a memory system in accordance with an embodiment.

FIG. 8 illustrates a plurality of memory dies 1501 to 150n included in the memory device 150 of FIG. 1, among the components of the memory system 110, in accordance with an embodiment. For example, the memory device 150 may include a first memory die 1501 and a second memory die 1502.

Each of the first and second memory dies 1501 and 1502 may include a plurality of planes. For example, the first memory die 1501 may include a first plane PLANE00 and a second plane PLANE01, and the second memory die 1502 may include a third plane PLANE10 and a fourth plane PLANE11. Each of the planes may include a plurality of blocks. For example, the first plane PLANE00 may include first to $N^{th}$ memory blocks BLOCK000 to BLCOK00N, and the second plane PLANE01 may include first to NW memory blocks BLOCK010 to BLCOK01N. The third plane PLANE10 may include first to $N^{th}$ memory blocks BLOCK100 to BLCOK10N, and the fourth plane PLANE11 may include first to $N^{th}$ memory blocks BLOCK110 to BLCOK11N.

The first memory die 1501 is capable of inputting/outputting data through a zeroth channel CH0, and the second memory die 1502 is capable of inputting/outputting data through a first channel CH1. The zeroth channel CH0 and the first channel CH1 may input/output data in an interleaving scheme.

The first memory die 1501 includes the plurality of planes PLANE00 and PLANE01 corresponding to a plurality of ways WAY0 and WAY1, respectively, capable of inputting/outputting data in the interleaving scheme by sharing the zeroth channel CH0.

The second memory die 1502 includes the plurality of planes PLANE10 and PLANE11 corresponding to a plurality of ways WAY2 and WAYS, respectively, capable of inputting/outputting data in the interleaving scheme by sharing the first channel CH1.

The plurality of memory blocks in the memory device 150 may be divided into groups based on physical locations where the same way or channel is used.

While the embodiment of FIG. 8 shows a configuration of the memory device 150 in which there are two dies, each having two planes, the present invention is not limited to this configuration. Any suitable die and plane configuration may be used based on system design considerations. The number of memory blocks in each plane may vary as well.

The controller 130 may group memory blocks which can be selected simultaneously, among the plurality of memory blocks in different dies or different planes, based on their physical locations, and manage the memory block groups as super memory blocks.

The scheme in which the controller 130 groups the memory blocks into super memory blocks and manages the super memory blocks may be performed in various ways according to a designer's selection. Three exemplary schemes are described below.

A first scheme is that the controller 130 groups an arbitrary memory block BLOCK000 of the first plane PLANE00 and an arbitrary memory block BLOCK010 of the second plane PLANE01 in the first memory die of the plurality of memory dies 1501 and 1502 in the memory device 150, and manages the grouped memory blocks BLOCK000 and BLOCK010 as a single super memory block A1. When the first scheme is applied to the second memory die 1502 in the memory device 150, the controller 130 may group an arbitrary memory block BLOCK100 of the first plane PLANE10 and an arbitrary memory block BLOCK110 of the second plane PLANE11 in the second memory die 1502, and manage the grouped memory blocks BLOCK100 and BLOCK110 as a single super memory block A2.

A second scheme is that the controller 130 groups an arbitrary memory block BLOCK002 in the first plane PLANE00 of the first memory die 1501 and an arbitrary memory block BLOCK102 in the first plane PLANE10 of the second memory die 1502, and manages the grouped memory blocks BLOCK002 and BLOCK102 as a single super memory block B1. In addition, according to the second scheme, the controller 130 may group an arbitrary memory block BLOCK012 in the second plane PLANE01 of the first memory die 1501 and an arbitrary memory block BLOCK112 in the second plane PLANE11 of the second memory die 1502, and manage the grouped memory blocks BLOCK012 and BLOCK112 as a single super memory block B2.

A third scheme is that the controller 130 groups an arbitrary memory block BLOCK001 in the first plane PLANE00 of the first memory die 1501, an arbitrary memory block BLOCK011 included in the second plane PLANE01 of the first memory die 1501, an arbitrary memory block BLOCK101 in the first plane PLANE10 of the second memory die 1502, and an arbitrary memory block BLOCK111 in the second plane PLANE11 of the second memory die 1502, and manages the grouped memory blocks BLOCK001, BLOCK011, BLOCK101 and BLOCK111 as a single super memory block C.

Accordingly, simultaneously-selectable memory blocks included in each of the super memory blocks may be substantially simultaneously selected through the interleaving scheme, for example, a channel interleaving scheme, a memory die interleaving scheme, a memory chip interleaving scheme or a way interleaving scheme.

In accordance with embodiments of the invention, based on the pattern of the first LBA and the second LBA, the size of the map segment may be variably adjusted and updated to the memory device, thereby reducing the number of updates to the memory device.

While the present invention has been illustrated and described with respect to specific embodiments, it will be apparent to those skilled in the art in light of the foregoing description that various changes and modifications may be made without departing from the spirit and scope of the invention as defined in the following claims.

What is claimed is:

1. A memory system comprising:
a controller including one or more processors; and
a memory device including a plurality of memory blocks,
wherein the controller comprises:
a command receiving circuitry suitable for receiving a first write command from a command queue;
a storage space checking circuitry suitable for checking whether there is available storage space in a zeroth map segment area, using a location of first logical block address (LBA) information written to the zeroth map segment area;
a pattern determining circuitry suitable for determining a pattern of the first LBA information and second LBA information corresponding to the first write command when there is no storage space in the zeroth map segment area;
a counting circuitry suitable for increasing a sequential count when the determination result of the pattern determining circuitry indicates that the pattern of the first and second LBA information is a sequential pattern;
an LBA generating circuitry suitable for generating one or more pieces of LBA information based on the sequential count; and
an updating circuitry suitable for performing a map updating operation on a memory block of the memory device by variably adjusting a size of the zeroth map segment area based on the one or more pieces of LBA information.

2. The memory system of claim 1, wherein the first LBA information includes previous LBA information of LBA information to be written currently, and the second LBA information includes LBA information to be written currently.

3. The memory system of claim 1, wherein the storage space checking circuitry determines that there is no available storage space in the zeroth map segment area when the location of the first LBA information written to the zeroth map segment area corresponds to last index thereof, and determines that there is available storage space in the zeroth map segment area when the location of the first LBA information written to the zeroth map segment does not correspond to the last index.

4. The memory system of claim 1, wherein, when the check result of the storage space checking circuitry indicates that there is available storage space in the zeroth map segment area, the updating circuitry updates the zeroth map segment area by writing the second LBA information corresponding to the first write command to the zeroth map segment area.

5. The memory system of claim 1, wherein, when the pattern determining circuitry determines that the pattern of the first LBA information written to the zeroth map segment area and the second LBA information corresponding to the first write command is a random pattern, the updating circuitry updates the zeroth map segment area to a memory block of the memory device.

6. The memory system of claim 1, wherein, the pattern determining circuitry determines the patterns of the first LBA information and the second LBA information until the first LBA information and the second LBA information are random patterns.

7. The memory system of claim 6, wherein, when the pattern determining circuitry determines that the pattern of the first and second LBA information is a random pattern, the updating circuitry performs the map updating operation on the memory block by variably adjusting the size of the zeroth map segment area based on the one or more LBA information.

8. The memory system of claim 1, wherein the size of the zeroth map segment area, which is variably adjusted, is obtained by merging the zeroth map segment area with the one or more pieces of LBA information generated based on the sequential count.

9. An operating method of a memory system which includes a controller including one or more processors and a memory device including a plurality of memory blocks, the operating method comprising:
   receiving a first write command;
   checking whether there is available storage space in a zeroth map segment area, using a location of first logical block address (LBA) information written to the zeroth map segment area;
   determining a pattern of the first LBA information and second LBA information corresponding to a first write command when there is no storage space in the zeroth map segment area;
   increasing a sequential count for the second LBA information when the pattern of the first and second LBA information is determined to be a sequential pattern;
   generating one or more pieces of LBA information based on the sequential count; and
   performing a map updating operation on a memory block of the memory device by variably adjusting a size of the zeroth map segment area based on one or more pieces of LBA information.

10. The operating method of claim 9, wherein the first LBA information includes previous LBA information of LBA information to be written currently, and the second LBA information includes LBA information to be written currently.

11. The operating method of claim 9, wherein the checking of whether there is storage space in the zeroth map segment includes:
   determining that there is no available storage space in the zeroth map segment area, when the location of the first LBA information written to the zeroth map segment area corresponds to a last index thereof; and
   determining that there is available storage space in the zeroth map segment area, when the location of the first LBA information written to the zeroth map segment does not correspond to the last index.

12. The operating method of claim 9, wherein, when the result of the checking of the storage space of the zeroth map segment indicates that there is available storage space in the zeroth map segment area, the controller updates the zeroth map segment area by writing the second LBA information corresponding to the first write command to the zeroth map segment area.

13. The operating method of claim 9, wherein, when the pattern of the first LBA information written to the zeroth map segment and the second LBA information corresponding to the first write command is determined to be a random pattern, the zeroth map segment area is updated to a memory block of the memory device.

14. The operating method of claim 9, wherein, the controller determines the patterns of the first LBA information and the second LBA information until the first LBA information and the second LBA information are random patterns.

15. The operating method of claim 14, wherein, when the pattern of the first and second LBA information is a random pattern, the controller performs the map updating operation on the memory block by variably adjusting the size of the zeroth map segment based on the one or more pieces of LBA information.

16. The operating method of claim 9, wherein, during the map updating operation, the size of the zeroth map segment area is variably adjusted by merging the zeroth map segment area with the one or more pieces of LBA information generated based on the sequential count.

17. An operating method of a memory system which includes a controller including one or more processors and a memory device including a plurality of memory blocks, the operating method comprising:
   receiving a first write command;
   checking whether there is available storage space in a zeroth map segment area, using a location of first logical block address (LBA) information written to the zeroth map segment area;
   determining a pattern of the first LBA information written to the zeroth map segment area and second LBA information corresponding to the first write command when there is no available storage space in the zeroth map segment area;
   increasing a sequential count for the second LBA information until the pattern of the first and second LBA information is a random pattern;
   updating the zeroth map segment area to a memory block when the pattern of the first and second LBA information is a random pattern; and
   changing the zeroth map segment area to a first map segment area, generating one or more pieces of LBA information based on the sequential count, and writing the generated one or more pieces of LBA information to the second map segment area.

18. The operating method of claim 17, wherein the first LBA information includes previous LBA information of LBA information to be written currently, and the second LBA information includes LBA information to be written currently.

19. A memory system comprising:
   a memory device including a plurality of memory blocks; and
   a controller including a memory and a cache controller suitable for storing logical block address (LBA) information in the memory and update the LBA information to the memory device:
   wherein the cache controller is suitable for:
   receiving and storing a plurality of pieces of LBA information in the memory;
   generating a map segment that includes multiple pieces of LBA information among the plurality of pieces of LBA information;
   determining whether a last piece of LBA information in the map segment and another piece of LBA information in a list that is received after the last piece of LBA information form a pattern; and
   updating the map segment or both the map segment and the list to a select block among the plurality of memory blocks based on the determined pattern.

* * * * *